Oct. 19, 1971   O. H. REINBOLD   3,613,349
TIME MEASURING AND DATE INDICATING DEVICE
Filed Feb. 17, 1970   2 Sheets-Sheet 1

INVENTOR.
OTTO HORST REINBOLD
BY

United States Patent Office 3,613,349
Patented Oct. 19, 1971

---

3,613,349
TIME MEASURING AND DATE INDICATING DEVICE
Otto Horst Reinbold, Denzlingen, Germany, assignor to Blessing-Werke KG, Feinbau, Waldkirch im Breisgau, Germany
Filed Feb. 17, 1970, Ser. No. 12,077
Claims priority, application Germany, Feb. 21, 1969, G 69 06 772
Int. Cl. G04b *19/24*
U.S. Cl. 58—4                                    10 Claims

ABSTRACT OF THE DISCLOSURE

A clock is provided with a large ring concentric with the pointer axis and indicating the day of the month and a smaller overlapping eccentric disk indicating the names of the months which can be viewed through windows in the dial arranged along a line passing through the axis of the pointers.

BACKGROUND OF THE INVENTION

Clocks and watches are known which have indicator means for indicating the numbers 1 to 31 of the days of any month. The indicator member is stepwise shifted every day by the clockwork, but it is also possible to provide manually operated means for shifting the indicator member so that adjustments can be made for days having only 30 days, and for February having 28 or 29 days. It is also known to provide watches with an indicator for indicating the seven days of the week, and being shifted every day from the clockwork.

SUMMARY OF THE INVENTION

It is the object of the invention to provide a clock or watch with means for indicating not only the day of the month, but also the name of the month so that a complete date, with the exception of the year is indicated.

Since a month indicating member has to be shifted only at the end of the month, it is sufficient to operate the month indicating member by a manual operation, although it would be possible to drive the month indicating member by the clockwork.

A particularly simple and inexpensive embodiment of the invention has a rotatable month indicating member which is stepwise operated by a manually operated spring biassed pawl mounted on the casing of the clock or watch. In order to permit an easy reading of the date and month, and also from the point of view of a compact construction combined with the clockwork, it is advantageous to provide a dial with a left window for viewing the indicating means including a ring representing the days of the month, and with a right window for viewing the indicating means including a disk representing the names of the month. The two windows are arranged on opposite sides of the axis about which the pointers turn, and are spaced different radial distances from the same so that the indicating disk and ring overlap in the outer region of the dial without obstructing the indicating function or covering the central portion of the clockwork.

In the preferred embodiment of the invention, the day indicating member and the month indicating member are both operated by manually operated means mounted symmetrically on opposite sides of the casing, but the day indicating member is normally driven from the clockwork.

The novel features which are considered as characteristic for the invention are set forth in particular in the appended claims. The invention itself, however, both as to it construction and its method of operation, together with additional objects and advantages thereof, will be best understood from the following description of specific embodiments when read in connection with the accompanying drawings.

DESCRIPTION OF THE PREFERRED EMBODIMENT

Figure 1:
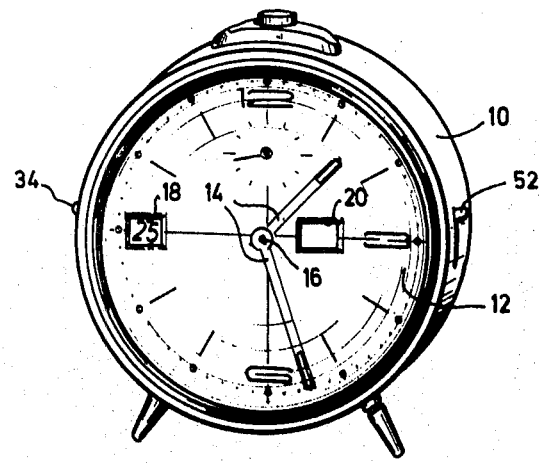
FIG. 1 is a perspective view of an alarm clock provided with month and day indicating means according to the invention.

A dial 12 is part of a casing 10 in which a clockwork is mounted by which time indicating pointers 14 are rotated about an axis 16. The dial has a left window 18 and a right window 20 for indicating the day of the month and the name of the month, respectively. As clearly shown in FIG. 1, the windows 18 and 20 are disposed along a line passing through the axis about which the pointers 14 turn, spaced different radial distances from the same.

Figure 2:
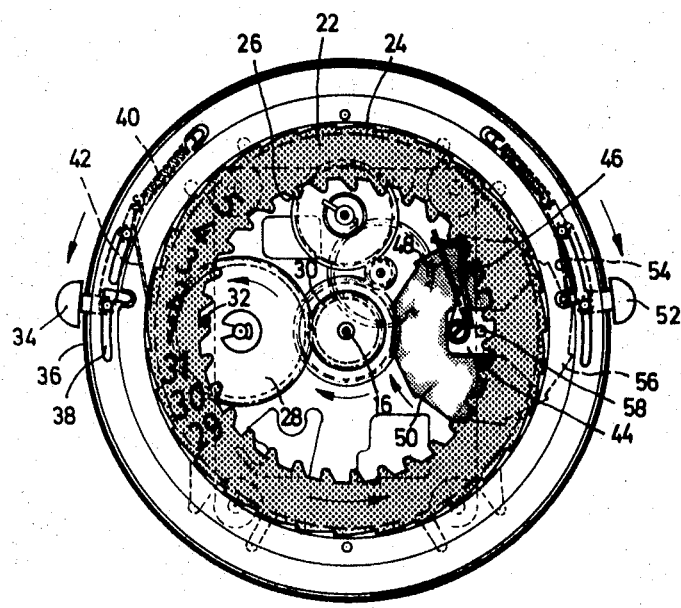
FIG. 2 is a front view of the device with the front wall and dial of the casing omitted.

As best seen in FIG. 2, the day indicating member is an annular gear ring 22 which is mounted in the clockwork for rotation about the central axis, and has an outer circular peripheral gear rim 24, and an inner circular gear rim 26. A day gear 28 makes one revolution in 24 hours and has a coupling pin 32 meshing with the inner gear 26 and shifting the day indicating member 22 one step corresponding to one day every 24 hours. Day gear 28 is driven by an hour gear 30 which turns one revolution during each hour.

Every time day indicating member 22 is shifted one angular step, the respective next following indicia representing the day of the month appears behind the window 18.

Additionally to the drive of the day indicating member 22 from the clockwork, manually operable means are mounted on the casing 10 for manually and stepwise shifting the day indicating member 22. An angular lever 34 is provided with a fingerpiece, and with two pins guided in a slot 38 in the casing, while an arm of lever 34 is guided in a peripheral slot 36 of the casing. A spring 40 is secured to the casing and to the end of lever 34 and biasses the same to a position of rest. When member 34 is shifted in slots 38, 36, a pawl 42 consisting of resilient material, shifts day indicating member 22 one step. In order to prevent a return movement in clockwise direction, as view in FIG. 2, an arresting pawl 46 is mounted on a plate 44 and tensioned by a spring 48 toward the inner gear 26 so that pawl 46 engages and arrests the day indicating member in each angularly turned position representing a different day of the month.

A month indicating member 50 whose month representing indicia appear behind the right window 20, is mounted on the clockwork for rotation about an axis parallel to the axis of the pointers, and spaced from the same. Month indicating member 50 is a disk having a ratchet gear rim about its periphery, cooperating with the resilient pawl 54 which is connected with an angular lever 52 including a fingerpiece, and guided in slots of the casing, as described with reference to the angular lever 34. A spring is connected with angular lever 52 and biasses the same. Whenever lever 52 is operated, pawl 54 engages a tooth on the gear rim 56 of month indicating member 50 and turns the same about the axis 58 so that another indicia representing a month appears behind window 20. The diameter of disk 50 is greater than the radial extension of ring 22 but less than the radius of the clockwork and of casing 10 so that there is room for hour gear 30 in the region of the axis 16.

Figure 3:
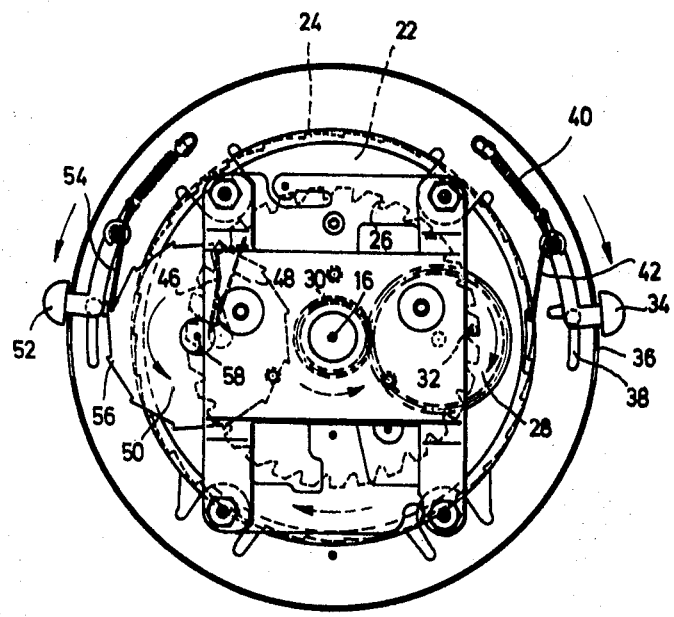
FIG. 3 is a rear view of the device with the rear wall of the casing omitted.

The manually operated means for stepwise displacing the day indicating member 22 and the month indicating member 50, are best seen in FIG. 3.

The arrangement of the windows 18 and 20 spaced different radial distances from the axis 16 of pointers 14, and located in a line extending across the dial in horizontal direction as viewed by an observer, permits a particularly favorable arrangement of the annular day indicating member 22, and the smaller month indicating member 50 since the two members can overlap in the outer region of the dial, without obstructing the indicating function of the month indicating member 50.

Parts which have no bearing on the present invention have been omitted in the illustration of the clockwork in the drawing for the sake of clarity. The invention is suitable for any time measuring and date indicating device, and not limited to a clock or a watch. However, the invention is particularly adapted for use with alarm clocks, and any type of manually operated means may be used for shifting the day and month indicating members.

It will be understood that each of the elements described above, or two or more together, may also find a useful application in other types of time measuring and date indicating devices differing from other types described above.

While the invention has been illustrated and described as embodied in a manually shifted indicator for indicating indicia representing the months behind a window of the dial of a clock, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Time measuring and date indicating device, comprising a casing having first and second windows; pointer means driven by said clockwork about a first axis; a circular ring having a center located in said first axis, and being mounted for rotation about the same, said ring having thirty-one first indicia indicating the days of the month arranged along a circular line concentric with said first axis and passing through said first window, said ring having outer and inner peripheral toothed rims; transmission means surrounded by said ring and connecting said clockwork with said inner toothed rim for rotating said ring between thirty-one positions in which said first indicia are located behind said first window, respectively, for indicating the day of the month; first manually operable means mounted on said casing and cooperating with said outer toothed rim for turning said ring between said positions; a month indicating disk mounted on said clockwork for turning movement about a second axis spaced from said first axis and having a diameter greater than the radial extension of said ring but less than the radius of said clockwork and casing so that a radially inner portion of said disk is located between said inner toothed rim and said central axis, said disk having twelve second indicia indicating the months and being arranged along a circular line passing through said second window, said second window being located opposite said radially inner portion of said disk and inward of said inner toothed rim of said ring, said disk having a peripheral outer toothed rim; and second manually operated means mounted on said casing cooperating with said outer toothed rim of said disk for moving said disk between twelve positions in which said second indicia, respectively, are located behind said second window.

2. A device as claimed in claim 1 wherein said first window is farther spaced in radical directions from said first axis than said second window.

3. A device as claimed in claim 1 wherein said casing includes a dial having said first and second windows; and wherein said first window is located on the left, and said second window is located on the right of said first axis.

4. A device as claimed in claim 3 wherein said first and second windows are locataed on a line passing through said central axis.

5. A device as claimed in claim 1, wherein said first window is farther spaced in radial direction from said first axis than said second window; wherein said causing includes a dial having said first and second windows; wherein said first window is located on the left, and said second window is located on the right of said first axis; and wherein said first and second windows are located on a line passing through said central axis.

6. A device as claimed in claim 1 wherein said outer toothed rim has substantially the same diameter as said clockwork; wherein said outer toothed rims of said ring and of said disk have ratchet teeth; and wherein said first and second manually operable means include pawls cooperating with said ratchet teeth for manually stepwise turning said ring and said disk between the respective positions of the same.

7. A device as claimed in claim 1 wherein said transmission means include a day gear driven by said clockwork to rotate once every day, and having a coupling pin cooperating with said toothed inner rim of said ring for stepwise turning the same between said positions of the same.

8. A device as claimed in claim 7 whcerein said clockwork includes an hour gear connected with said pointer means and being concentric with said first axis; and wherein said hour gear meshes with said day gear.

9. A device as claimed in claim 1 wherein said first and second indicia are numerals and words, respectively, the numerals and words behind said first and second windows being based on a straight horizontal line passing through said first axis.

10. A device as claimed in claim 1 wherein said first and second manually operable means are diametrically disposed on said casing.

References Cited

UNITED STATES PATENTS 2,764,828  10/1956  Wolaver _____ 58—4

FOREIGN PATENTS 1,025,385  4/1953  France _____ 58—4

RICHARD B. WILKINSON, Primary Examiner

E. C. SIMMONS, Assistant Examiner

U.S. Cl. X.R.

40—113